(12) United States Patent
Sun

(10) Patent No.: US 11,295,421 B2
(45) Date of Patent: Apr. 5, 2022

(54) IMAGE PROCESSING METHOD, IMAGE PROCESSING DEVICE AND ELECTRONIC DEVICE

(71) Applicant: Guangdong Oppo Mobile Telecommunications Corp., Ltd., Guangdong (CN)

(72) Inventor: Jianbo Sun, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 147 days.

(21) Appl. No.: 16/563,370

(22) Filed: Sep. 6, 2019

(65) Prior Publication Data
US 2019/0392561 A1    Dec. 26, 2019

Related U.S. Application Data

(63) Continuation of application No. PCT/CN2018/075492, filed on Feb. 6, 2018.

(30) Foreign Application Priority Data

Mar. 9, 2017    (CN) .......................... 201710138846.5

(51) Int. Cl.
*G06T 5/00* (2006.01)
*G06T 7/55* (2017.01)

(52) U.S. Cl.
CPC .............. *G06T 5/008* (2013.01); *G06T 5/009* (2013.01); *G06T 7/55* (2017.01); *G06T 2207/10028* (2013.01); *G06T 2207/20208* (2013.01)

(58) Field of Classification Search
CPC ........... G06T 5/008; G06T 7/55; G06T 5/009; G06T 2207/10028; G06T 2207/20208; G06T 2207/10004
See application file for complete search history.

(56) References Cited

U.S. PATENT DOCUMENTS 7,840,066 B1 * 11/2010 Chen ......................... G06T 5/40
                                                            382/168
10,306,203 B1 * 5/2019 Goyal ................ G01B 11/2513
(Continued)

FOREIGN PATENT DOCUMENTS

| CN | 103024165 A | 4/2013 |
| CN | 104202524 A | 12/2014 |

(Continued)

OTHER PUBLICATIONS

OA for EP application 18763396.1 dated Jan. 17, 2020.
(Continued)

*Primary Examiner* — Shahbaz Nazrul
(74) *Attorney, Agent, or Firm* — Young Basile Hanlon & MacFarlane, P.C.

(57) ABSTRACT

The present disclosure provides an image processing method, an image processing device and an electronic device. The image processing method is configured to process scene data acquired by an imaging device. The scene data includes a first scene image. The method includes: processing the scene data to obtain a scheme of the first scene image; and processing the first scene image corresponding to the scheme, to enhance contrast between the scheme of the first scene image and a remaining part of the first scene image.

16 Claims, 13 Drawing Sheets

(56) References Cited

U.S. PATENT DOCUMENTS

| | | | |
|---|---|---|---|
| 2004/0105032 A1* | 6/2004 | Kim | H04N 1/6027 |
| | | | 348/607 |
| 2013/0169760 A1* | 7/2013 | Watts | G06T 5/002 |
| | | | 348/47 |
| 2014/0362188 A1 | 12/2014 | Yokokawa et al. | |
| 2015/0279033 A1* | 10/2015 | Murakami | G06T 7/136 |
| | | | 382/128 |
| 2016/0125633 A1* | 5/2016 | Windmark | H04N 5/2625 |
| | | | 382/103 |
| 2016/0191896 A1* | 6/2016 | Basche | H04N 5/23232 |
| | | | 348/46 |
| 2018/0122049 A1* | 5/2018 | Tsang | G06T 5/002 |
| 2018/0232587 A1* | 8/2018 | Wang | G06K 9/00771 |
| 2019/0392611 A1* | 12/2019 | Sun | H04N 5/23222 |

FOREIGN PATENT DOCUMENTS

| | | |
|---|---|---|
| CN | 104333710 A | 2/2015 |
| CN | 104333748 A | 2/2015 |
| CN | 104363377 A | 2/2015 |
| CN | 104424624 A | 3/2015 |
| CN | 104994363 A | 10/2015 |
| CN | 105303543 A | 2/2016 |
| CN | 105933532 A | 9/2016 |
| CN | 106101547 A | 11/2016 |
| CN | 106303250 A | 1/2017 |
| CN | 106991696 A | 7/2017 |
| JP | H1127577 A | 1/1999 |

OTHER PUBLICATIONS

EE368 Project Report; Using Depth Mapping to realize Bokeh effect with a single camera Android device; Jie Gong, Ran Liu, Pradeep Vukkadala; 9 pages.

International Search Report with English Translation for PCT/CN2018/075492 dated Mar. 9, 2017.

Office Action with English Translation for CN application 201710138846.5 dated May 24, 2019.

Indian Examination Report for IN Application 201917035936 dated Jun. 14, 2021. (5 pages).

* cited by examiner

IMAGE PROCESSING METHOD, IMAGE PROCESSING DEVICE AND ELECTRONIC DEVICE

CROSS-REFERENCE TO RELATED APPLICATION(S)

This application is a continuation of International Application No. PCT/CN2018/075492, filed on Feb. 6, 2018, which is based on and claims priority to Chinese Patent Application No. 201710138846.5, filed on Mar. 9, 2017, the entire contents of both of which are incorporated herein by reference.

TECHNICAL FIELD

The present disclosure generally relates to the imaging technical field, and more particularly, to an image processing method, an image processing device, and an electronic device.

BACKGROUND

A backlight effect image is obtained by image processing to make the image have an effect of backlight photographing. When a scheme of the image is not determined or cannot be determined, it is easy to cause the scheme of the generated backlight effect image less prominent, resulting in poor bokeh effect.

SUMMARY

The present disclosure aims to solve at least one of technical problems existing in the related art. For this, embodiments of the present disclosure provide an image processing method, an image processing device and an electronic device.

An image processing method is configured to process scene data acquired by an imaging device. The scene data includes a first scene image, and the method includes: processing the scene data to obtain a scheme of the first scene image; and processing the first scene image corresponding to the scheme, to enhance contrast between the scheme of the first scene image and a remaining part of the first scene image.

An image processing device is configured to process scene data acquired by an imaging device. The scene data includes a first scene image, and the device includes a memory and a processor.

The memory is configured to store instructions executable by the processor.

The processor is configured to run a program corresponding to the instructions by reading the instructions stored in the memory, so as to perform the image processing method.

An electronic device includes an imaging device and the image processing device. The imaging device is configured to acquire scene data, the scene data including a first scene image. The image processing device is electrically coupled to the imaging device and configured to process the scene data to obtain a scheme of the first scene image, and to process the first scene image corresponding to the scheme to enhance contrast between the scheme of the first scene image and a remaining part of the first scene image.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and/or other aspects and advantages of embodiments of the present disclosure will become apparent and more readily appreciated from the following descriptions made with reference to the accompanying drawings, in which.

DETAILED DESCRIPTION

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

Figure 1:
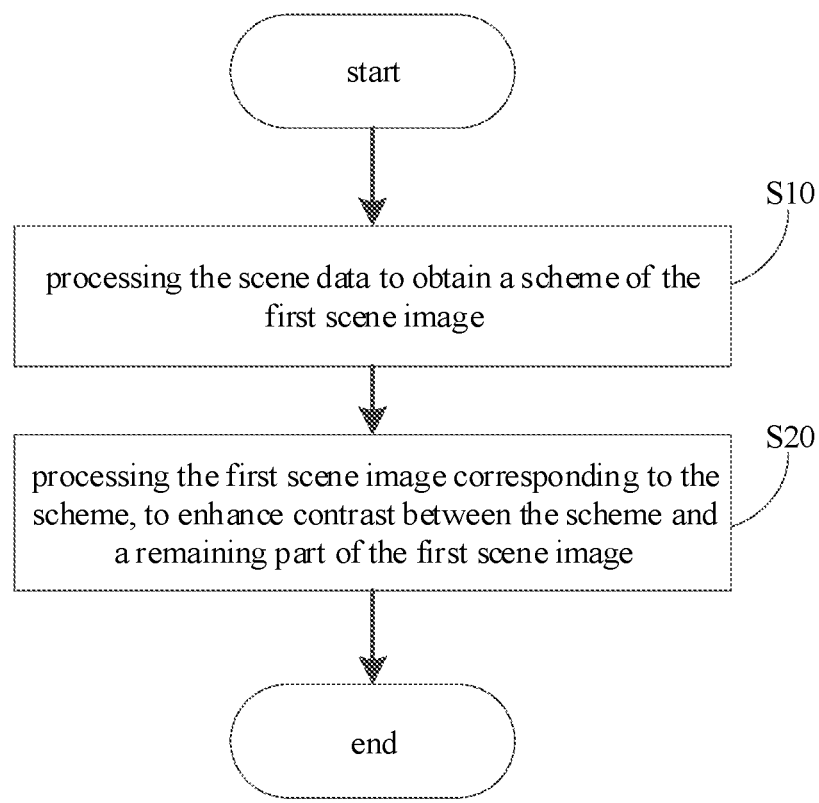
FIG. 1 is a schematic flowchart of an image processing method according to embodiments of the present disclosure.
Figure 2:
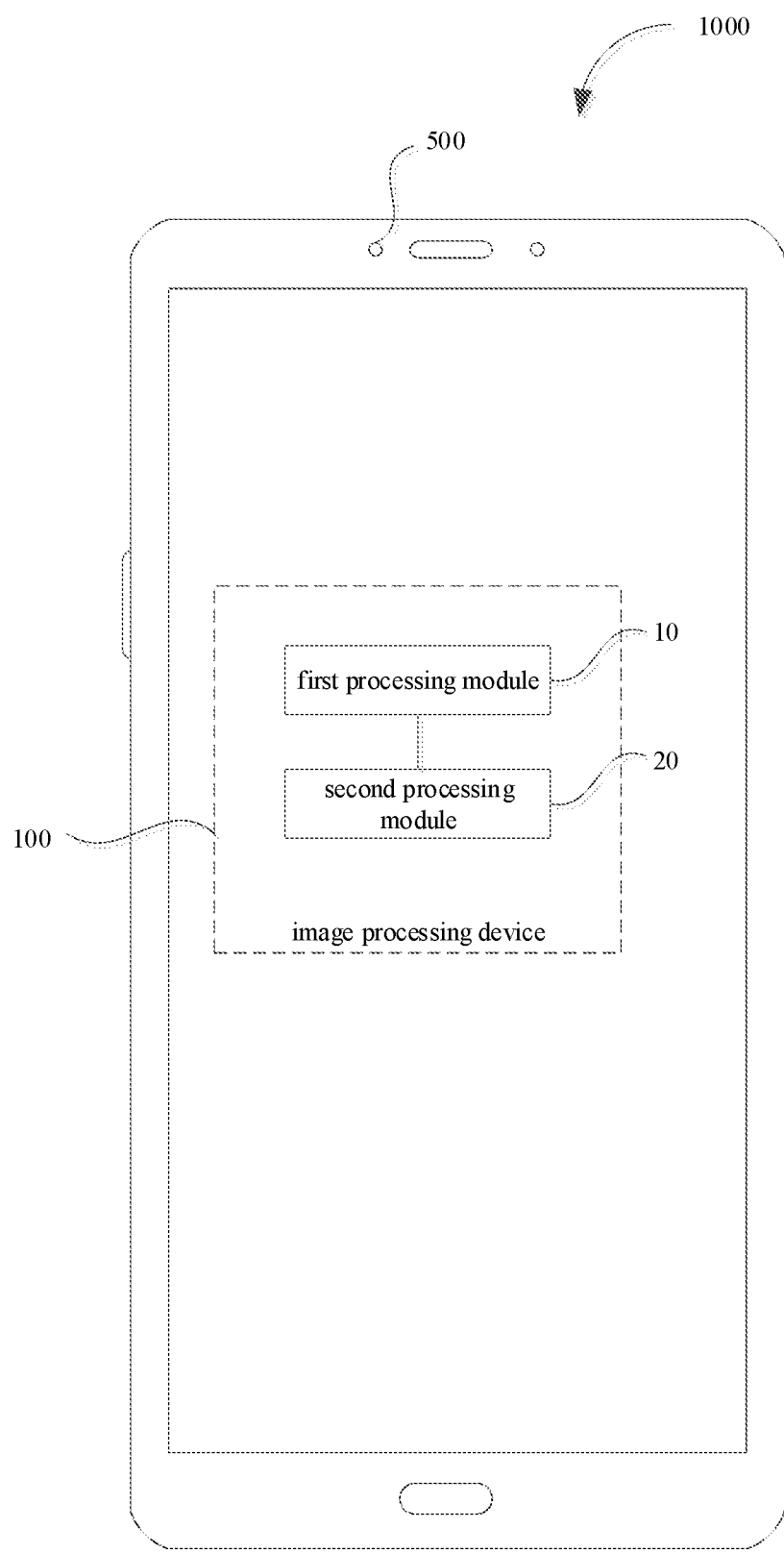
FIG. 2 is a schematic plan view of an electronic device according to embodiments of the present disclosure.

Please referring to FIG. 1 and FIG. 2 together, the image processing method according to embodiments of the present disclosure may be configured to process scene data acquired by the imaging device 500. The scene data includes a first scene image. The image processing method include followings.

At block S10, the scene data is processed to obtain a scheme of the first scene image.

At block S20, the first scene image corresponding to the scheme is processed, to enhance contrast between the scheme of the first scene image and a remaining part of the first scene image.

Please referring to FIG. 2 again, the image processing device 100 according to embodiments of the present disclosure may be configured to process the scene data acquired by the imaging device 500. The scene data includes the first scene image. The image processing device 100 includes a first processing module 10 and a second processing module 20. The first processing module 10 is configured to process the scene data to obtain the scheme of the first scene image. The second processing module 20 is configured to process the first scene image corresponding to the scheme to enhance contrast between the scheme of the first scene image and the remaining part of the first scene image.

That is, the image processing method according to embodiments of the present disclosure may be implemented by the image processing device according to embodiments of the present disclosure. The act at block S10 may be implemented by the first processing module 10, and the act at block S20 may be implemented by the second processing module 20.

In some implementation, the image processing device 100 according to embodiments of the present disclosure may be applied to the electronic device 1000 according to embodiments of the present disclosure, or in other words, the electronic device 1000 according to embodiments of the present disclosure may include the image processing device 100 according to embodiments of the present disclosure. In addition, the electronic device 1000 according to embodiments of the present disclosure further includes the imaging device 500. The imaging device 500 is electrically coupled to the image processing device 100.

With the image processing method, the image processing device 100, and the electronic device 1000 according to embodiments of the present disclosure, the first scene image is processed according to the depth information, such that the backlight effect image with a better bokeh effect is obtained.

In some implementation, the electronic device 1000 includes a mobile phone, a tablet computer, a smart watch, a notebook computer, a smart bracelet, smart glasses, or a smart headset. In embodiments of the present disclosure, the electronic device 1000 is the mobile phone.

In some implementation, the imaging device 500 includes a front camera and/or a rear camera, which is not limited here. In embodiments of the present disclosure, the imaging device 500 is the front camera.

Figure 3:
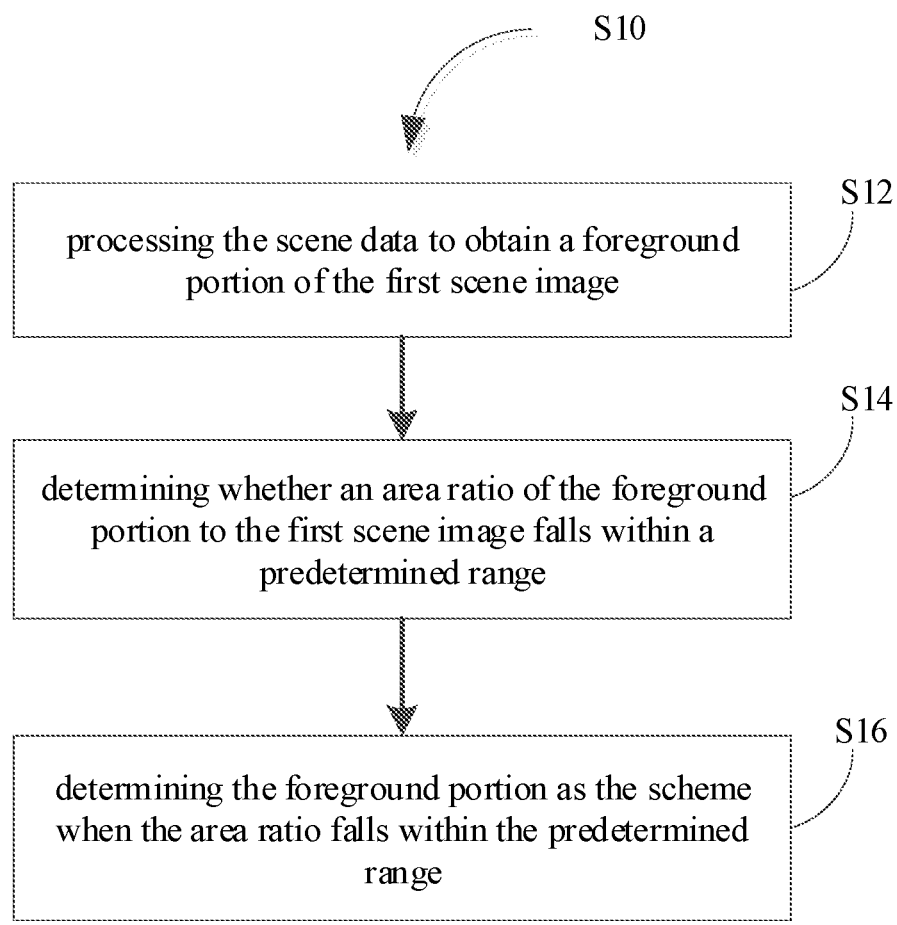
FIG. 3 is another schematic flowchart of an image processing method according to embodiments of the present disclosure.

Please referring to FIG. 3, in some implementation, the act at block S10 includes followings.

At block S12, the scene data is processed to obtain a foreground portion of the first scene image.

At block S14, it is determined whether an area ratio of the foreground portion to the first scene image falls within a predetermined range.

At block S16, the foreground portion is determined as the scheme when the area ratio falls within the predetermined range.

Figure 4:
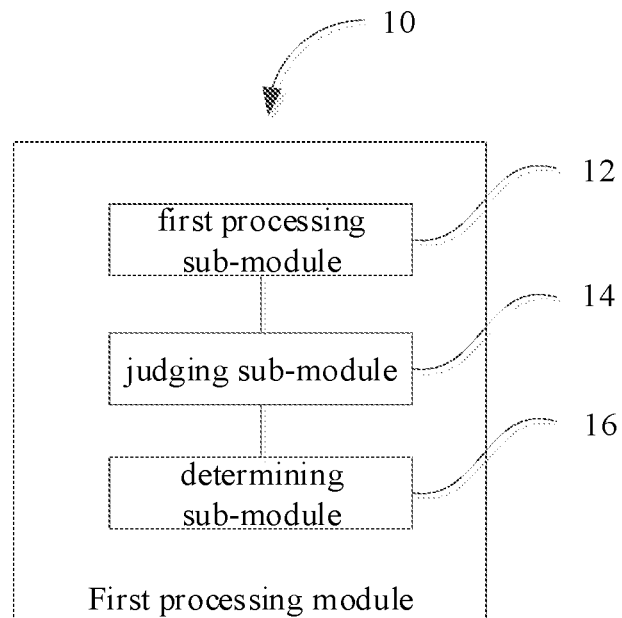
FIG. 4 is a schematic functional diagram of a first processing module according to embodiments of the present disclosure.

Please referring to FIG. 4, in some implementation, the first processing module 10 includes a first processing sub-module 12, a judging sub-module 14 and a determining sub-module 16. The first processing sub-module 12 is configured to process the scene data to obtain the foreground portion of the first scene image. The judging sub-module 14 is configured to determine whether the area ratio of the foreground portion to the first scene image falls within the predetermined range. The determining sub-module 16 is configured to determine that the foreground portion is the scheme when the area ratio falls within the predetermined range.

That is, the act at block S12 may be implemented by the first processing sub-module 12, the act at block S14 may be implemented by the judging sub-module 14, and the act at block S16 may be implemented by the determining sub-module 16.

In this way, the scheme of the first scene image may be obtained accurately.

It can be understood that, when the foreground portion is too small or too large, the backlight effect image obtained after processing by the image processing method is not good. For example, when the foreground portion is smaller, the scheme of the backlight effect image is less prominent. Therefore, when the foreground portion has a suitable size, it is determined that there is the scheme in the first scene image.

In some embodiments, the predetermined range is 15-60.

In this way, the backlight effect image with the better bokeh effect may be obtained.

Figure 5:
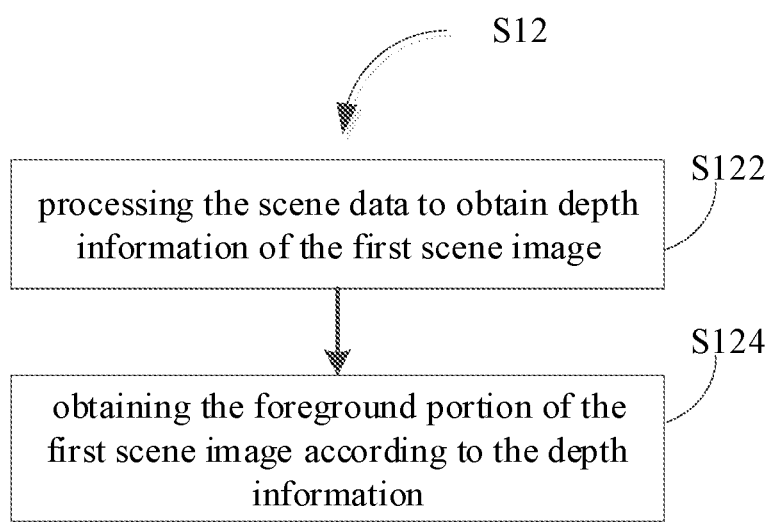
FIG. 5 is yet another schematic flowchart of an image processing method according to embodiments of the present disclosure.

Please referring to FIG. 5, in some implementation, the act at block S12 includes followings.

At block S122, the scene data is processed to obtain depth information of the first scene image.

At block S124, the foreground portion of the first scene image is obtained according to the depth information.

Figure 6:
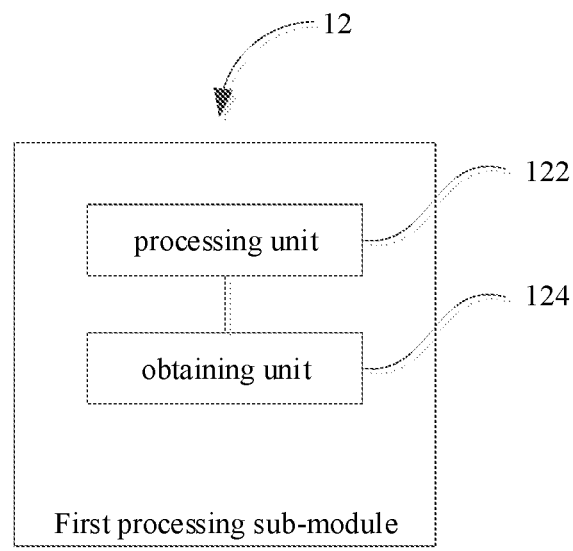
FIG. 6 is a schematic functional diagram of a first processing sub-module according to embodiments of the present disclosure.

Please referring to FIG. 6, in some implementation, the first processing sub-module 12 includes a processing unit 122 and an obtaining unit 124. The processing unit 122 is configured to process the scene data to obtain depth information of the first scene image. The obtaining unit 124 is configured to obtain the foreground portion of the first scene image according to the depth information.

That is, the act at block S122 may be implemented by the processing unit 122, and the act block S124 may be implemented by the obtaining unit 124.

In this way, the foreground portion of the first scene image may be obtained according to the depth information.

Figure 7:
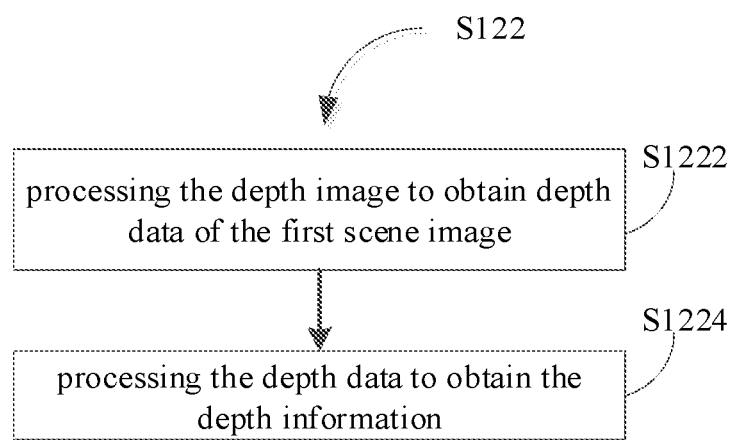
FIG. 7 is still another schematic flowchart of an image processing method according to embodiments of the present disclosure.

Please referring to FIG. 7, in some implementation, the scene data includes a depth image corresponding to the first scene image, and the act at block S122 includes followings.

At block S1222, the depth image is processed to obtain depth data of the first scene image.

At block S1224, the depth data is processed to obtain the depth information.

Figure 8:
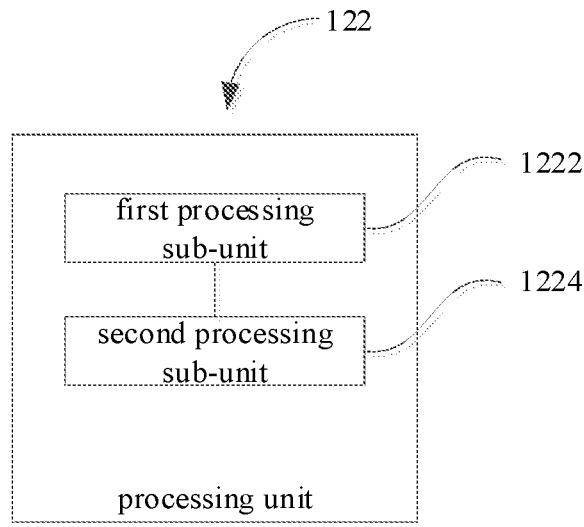
FIG. 8 is a schematic functional diagram of a processing unit according to embodiments of the present disclosure.

Please referring to FIG. 8, in some implementation, the processing unit 122 includes a first processing sub-unit 1222 and a second processing sub-unit 1224. The first processing sub-unit 1222 is configured to process the depth image to obtain depth data of the first scene image. The second processing sub-unit 1224 is configured to process the depth data to obtain the depth information.

That is, the act at block S1222 may be implemented by the first processing sub-unit 1222, and the act at block S1224 may be implemented by the second processing sub-unit 1224.

In this way, the depth information of the first scene image may be obtained quickly by using the depth image.

It can be understood that, the first scene image is RGB color image, and the depth image includes depth information of respective persons or objects in the scene. Since color information of the first scene image has a one-to-one correspondence relationship with the depth information of the depth image, it is possible to obtain the depth information of the first scene image.

In some implementation, there are two ways for obtaining the depth image corresponding to the first scene image, including obtaining the depth image by using structured light depth ranging, and obtaining the depth image by using a TOF (time of flight) depth camera.

When the depth image is obtained by using the structured light depth ranging, the imaging device 500 includes a camera and a projector.

It can be understood that, by using the structured light depth ranging, the light structure of a certain pattern is projected by the projector to the object surface, and forms a three-dimensional image of stripes modulated by the shape of the object to be measured. The three-dimensional image of stripes is detected by the camera to obtain a two-dimensional distorted image of stripes. The distortion degree of stripes is dependent on relative position between the projector and the camera and the profile and height of the object surface. The displacement shown along the stripes is proportional to the height of the object surface, the kink represents the plane change, and the discontinuity shows the physical gap of the surface. When the relative position between the projector and the camera is certain, the three-dimensional profile of the object surface may be reproduced by the distorted two-dimensional image of stipes, such that the depth information may be obtained. The structured light depth ranging has a higher resolution and measuring precision.

When the depth image is obtained by using the TOF depth camera, the imaging device 500 includes the TOF depth camera.

It can be understood that, the TOF depth camera records by a sensor, a phase change of infrared light sent by a light emitting unit to the object and infrared light reflected by the object, and can obtain a depth distance of the whole scene in real time according to the light speed within one wavelength. The TOF depth camera calculates the depth information without being affected by the grayscale and characteristics of the surface of the subject, and can calculate the depth information quickly, which has a higher real-time capability.

Figure 9:
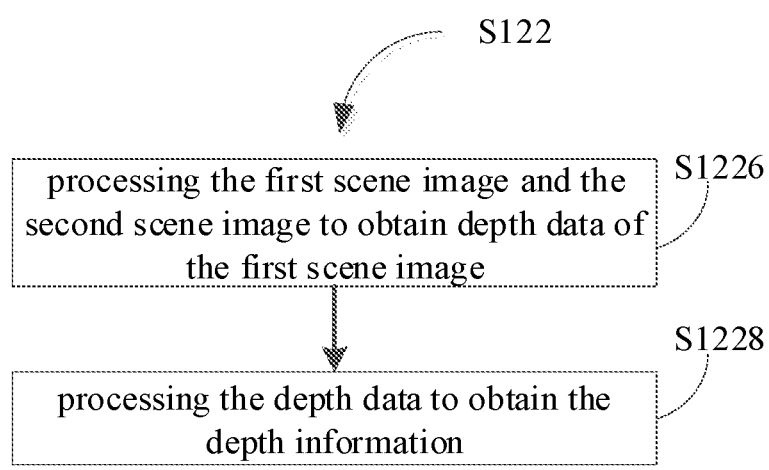
FIG. 9 is still yet another schematic flowchart of an image processing method according to embodiments of the present disclosure.

Please referring to FIG. 9, in some implementation, the scene data includes a second scene image corresponding to the first scene image, and the act at block S122 includes followings.

At block S1226, the first scene image and the second image are processed to obtain the depth data of the first scene image.

At block S1228, the depth data is processed to obtain the depth information.

Figure 10:
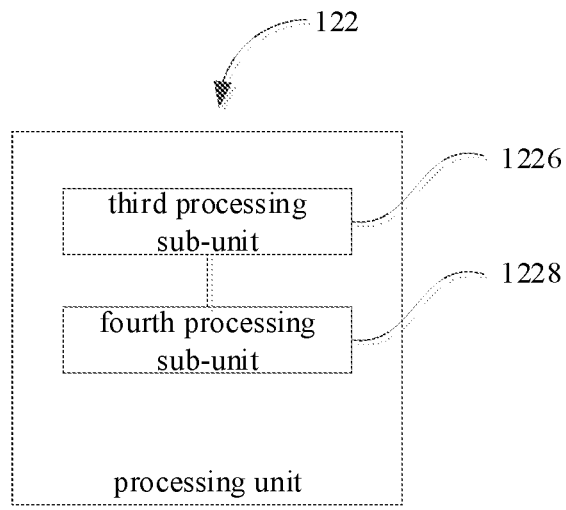
FIG. 10 is another schematic functional diagram of a processing unit according to embodiments of the present disclosure.

Please referring to FIG. 10, in some implementation, the processing unit 122 includes a third processing sub-unit 1226 and a fourth processing sub-unit 1228. The third processing sub-unit 1226 is configured to process the first scene image and the second scene image to obtain the depth data of the first scene image. The fourth processing sub-unit 1228 is configured to process the depth data to obtain the depth information.

That is, the act at block S1226 may be implemented by the third processing sub-unit 1226, and the act at block S1228 may be implemented by the fourth processing sub-unit 1228.

In this way, the depth information of the first scene image may be obtained by processing the first scene image and the second scene image.

In some implementation, the imaging device 500 includes a master camera and an auxiliary camera.

It can be understood that, the depth information may be obtained by a binocular stereoscopic ranging method, in this case, the scene data includes the first scene image and the second scene image. The first scene image is captured by the master camera, and the second scene image is captured by the auxiliary camera. With the binocular stereoscopic ranging, the same subject is imaged by two identical cameras from different locations to obtain stereo image pair of the subject, and then corresponding image points of the stereo image pair are obtained by a matching algorithm, thus calculating the parallax, and finally, the depth information is restored by using the method based on triangulation. In this way, the depth information of the first scene image may be obtained by performing matching on the stereo image pair of first scene image and second scene image.

Figure 11:
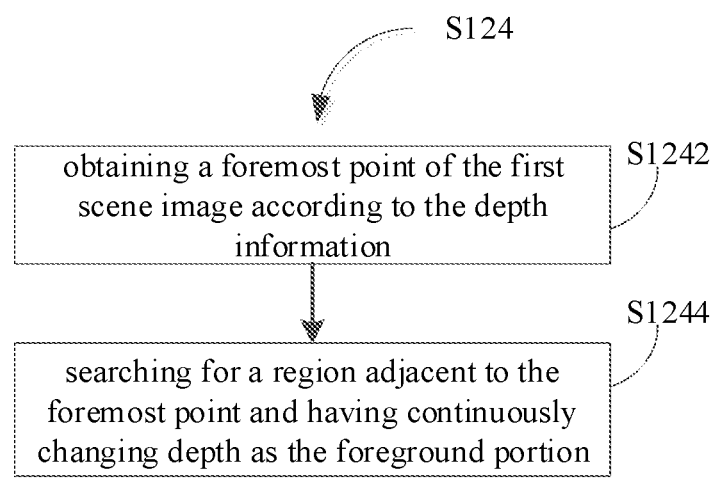
FIG. 11 is still yet another schematic flowchart of an image processing method according to embodiments of the present disclosure.

Please referring to FIG. 11, in some implementation, the act at block S124 includes followings.

At block S1242, a foremost point of the first scene image is obtained according to the depth information.

At block S1244, a region adjacent to the foremost point and having continuously changing depth is searched for as the foreground portion.

Figure 12:
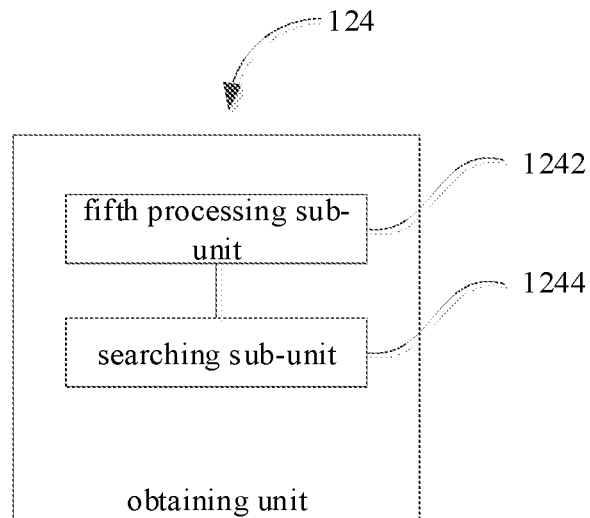
FIG. 12 is a schematic functional diagram of an obtaining unit according to embodiments of the present disclosure.

Please referring to FIG. 12, in some implementation, the obtaining unit 124 includes a fifth processing sub-unit 1242 and a searching sub-unit 1244. The fifth processing sub-unit 1242 is configured to obtain the foremost point of the first scene image. The searching sub-unit 1242 is configured to search for a region adjacent to the foremost point and having continuously changing depth as the foreground portion.

That is, the act at block S1242 may be implemented by the fifth processing sub-unit 1242, and the act at block S1244 may be implemented by the searching sub-unit 1244.

In this way, the physically connected foreground portion of the first scene image may be obtained. In real scene, the foreground portion is generally continuous. By taking the physically connected foreground portion as the scheme, the relationship of the foreground portion may be obtained visually.

In detail, the foremost point of the first scene image is first obtained according to the depth information. The foremost point is equivalent to the beginning of the foreground portion. Spreading from the foremost point, the region adjacent to the foremost point and having continuously changing depth is obtained. The region and the foremost point are merged into the foreground region.

It should be noted that, the foremost point refers to the pixel point corresponding to the object having the smallest depth, i.e., the pixel point corresponding to the object having a smallest object distance or closest to the imaging device 500. "adjacent to" refers to that two pixel points are connected together. "continuously changing depth" refers to that a depth difference of two adjacent pixel points is less than a predetermined difference. In other words, the depth of two adjacent pixel points whose depth difference is less than the predetermined difference continuously changes.

Figure 13:
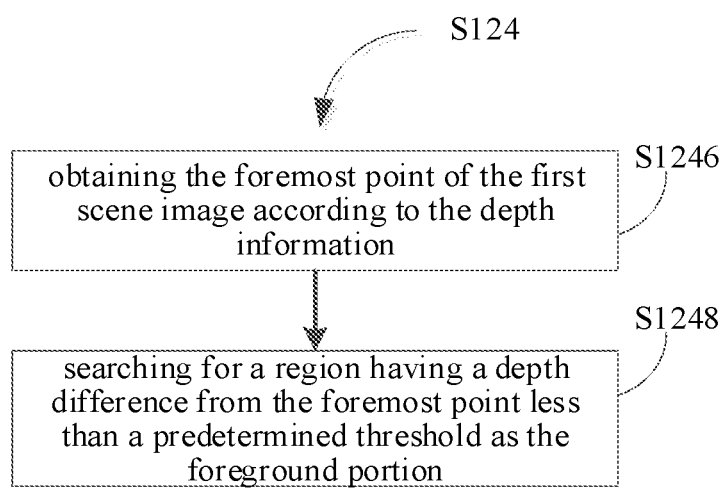
FIG. 13 is still yet another schematic flowchart of an image processing method according to embodiments of the present disclosure.

Please referring to FIG. 13, in some implementation, the act at block S124 includes followings.

At block S1246, the foremost point of the first scene image is obtained according to the depth information.

At block S1248, a region having a depth difference from the foremost point less than a predetermined threshold is searched for as the foreground portion.

In this way, the logically connected foreground portion of the first scene image may be obtained. In real scene, the foreground portion may not be continuous, but conforms to some logical relationship. For example, in the scene in which an eagle swoops down to catch a chicken, the eagle and the chicken may not be connected physically, but logically, it can be determined that they are connected.

In detail, the foremost point of the first scene image is first obtained according to the depth information. The foremost point is equivalent to the beginning of the foreground portion. Spreading from the foremost point, the regions, the depth difference of which from the foremost point is less than the predetermined threshold, are obtained. These regions and the foremost point are merged into the foreground region.

In some implementation, the predetermined threshold may be a value set by a user. In this way, the user may determine the range of the foreground portion according to his own demand, thus obtaining an ideal composition advice, and realizing an ideal composition.

In some implementation, the predetermined threshold may be a value determined in the image processing device 100, which is not limited here. The predetermined threshold determined in the image processing device 100 may be a fixed value stored internally, or may be a value calculated according to different situations, for example, the depth of the foremost point.

In some implementation, the act at block S124 may include followings.

The region having a depth within a predetermined interval is searched for as the foreground portion.

In this way, the foreground portion, the depth of which is within the suitable range, may be obtained.

It can be understood that, in some photographing situation, the foreground portion is not the foremost portion, but the portion slightly behind the foremost portion. For example, a person sits behind a computer, the computer is relatively front, but the person is the scheme. Thus, by taking the region having the depth within the predetermined interval as the foreground portion, it can effectively avoid inaccurate selection of the scheme.

Figure 14:
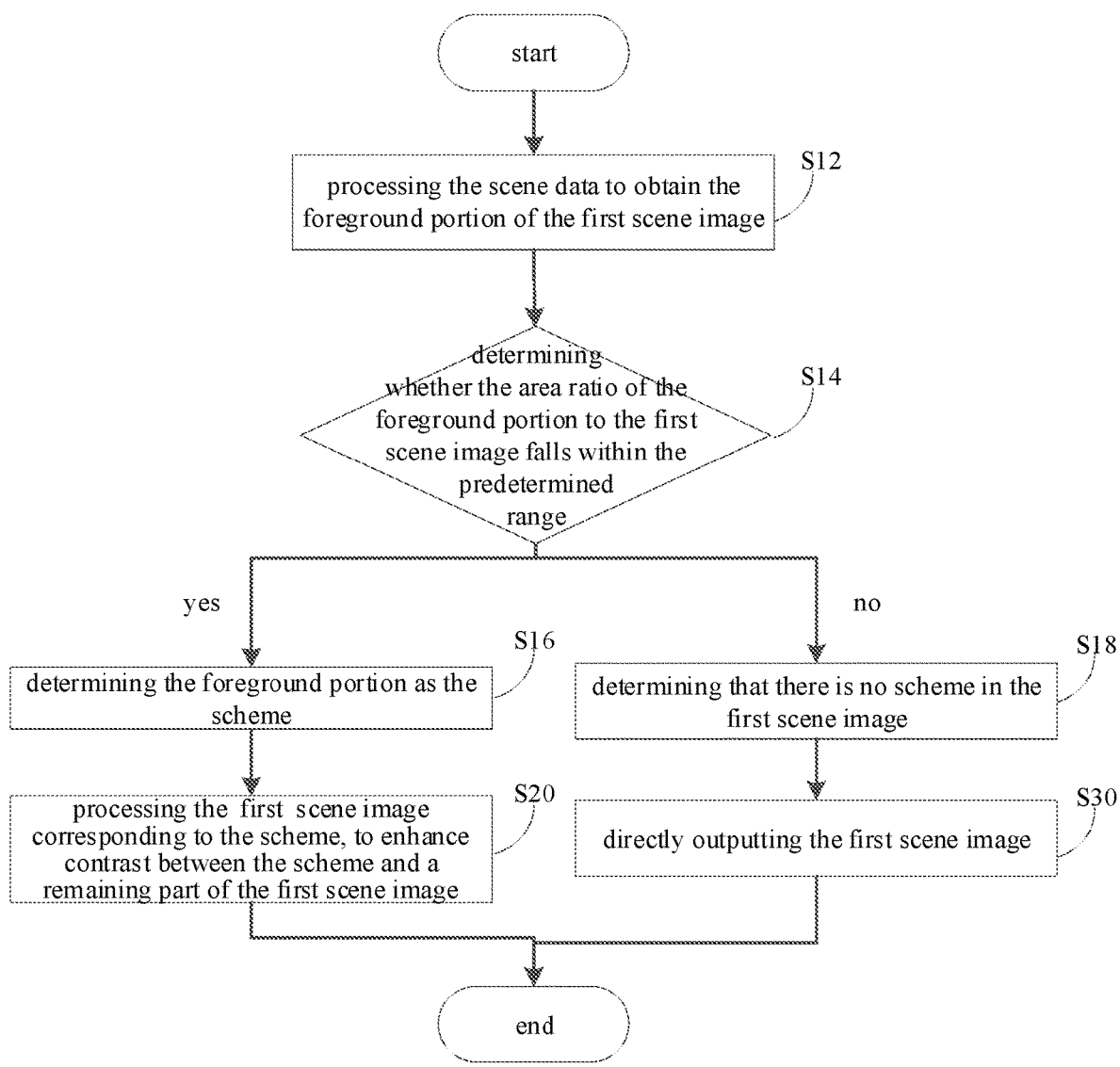
FIG. 14 is still yet another schematic flowchart of an image processing method according to embodiments of the present disclosure.

Please referring to FIG. 14, in some implementation, the act at block S10 includes followings.

At block S18, it is determined that there is no scheme in the first scene image when the area ratio goes beyond the predetermined range.

The image processing method includes followings.

At block S30, the first scene image is directly output when there is no scheme in the first scene image.

Figure 15:
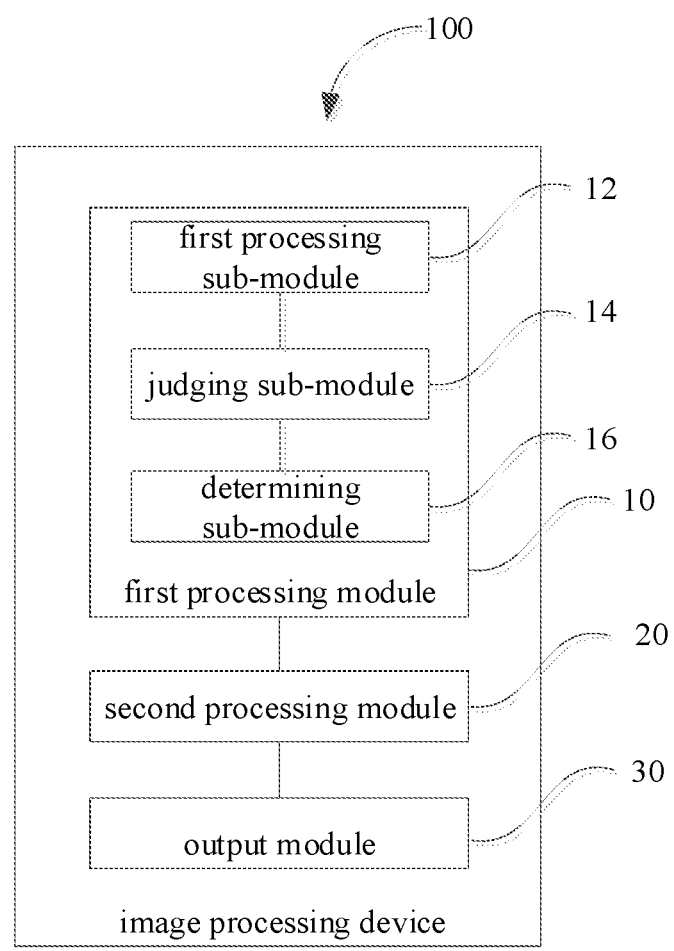
FIG. 15 is a schematic functional diagram of an image processing device according to embodiments of the present disclosure.

Please referring to FIG. 15, in some implementation, the determining sub-module 16 is further configured to determine that there is no scheme in the first scene image when the area ratio goes beyond the predetermined range. The image processing device 100 includes an output module 30. The output module 30 is configured to directly output the first scene image when there is no scheme in the first scene image.

That is, the act at block S18 may be implemented by the determining sub-module 16, and the act at block S30 may be implemented by the output module.

In this way, when the size of the foreground portion is not suitable, it is possible to determine that there is no scheme in the first scene image and directly output the first scene image, thereby reducing the image processing time.

Figure 16:
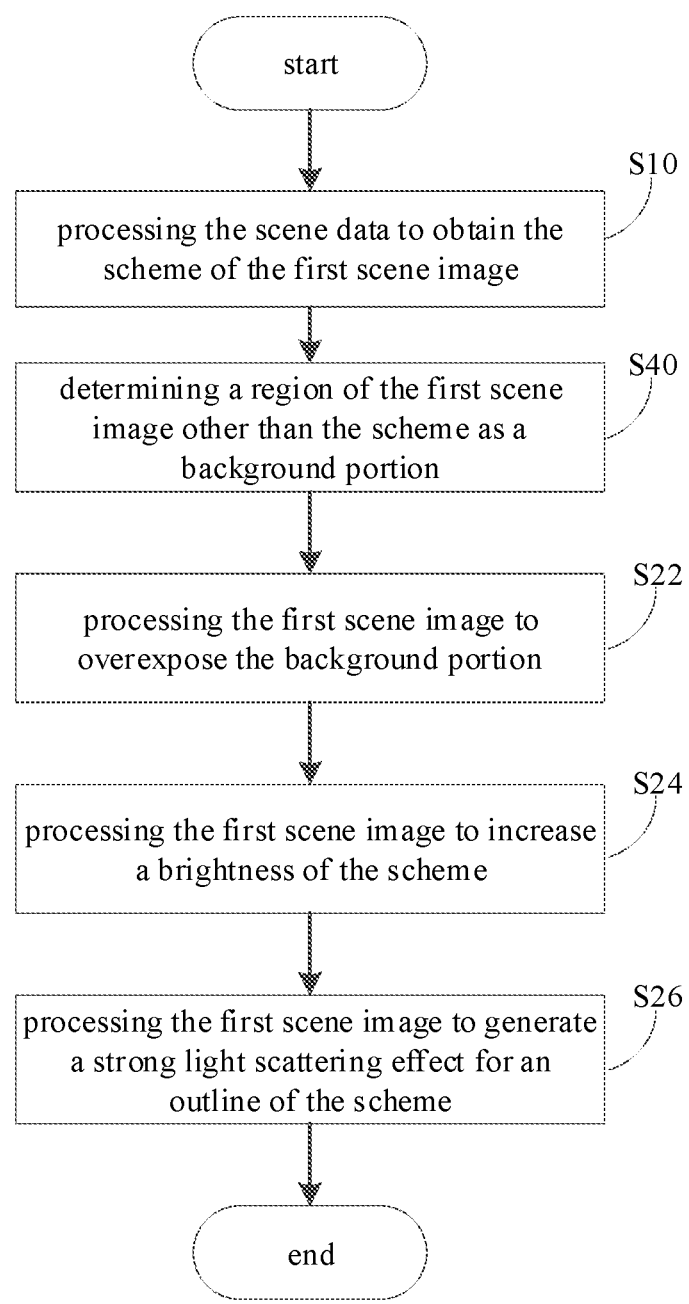
FIG. 16 is still yet another schematic flowchart of an image processing method according to embodiments of the present disclosure.

Please referring to FIG. 16, in some implementation, the image processing method includes followings.

At block S40, a region of the first scene image other than the scheme is determined as a background portion.

The act at block S20 includes followings.

At block S22, the first scene image is processed to expose the background portion.

At block S24, the first scene image is processed to increase a brightness of the scheme.

At block S26, the first scene image is processed to generate a strong light scattering effect for an outline of the scheme.

Figure 17:
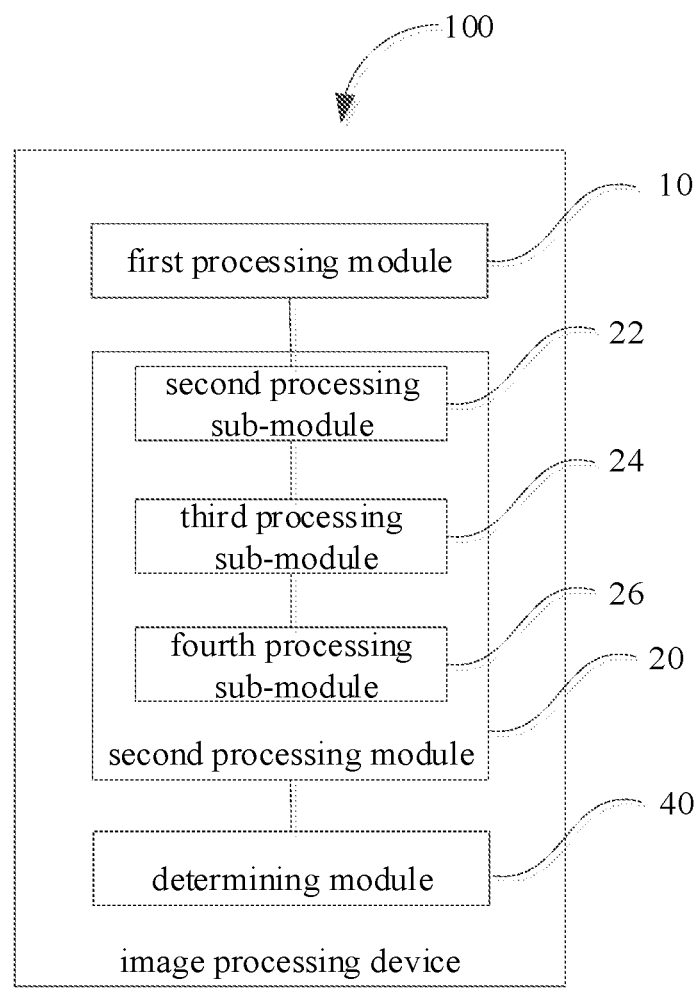
FIG. 17 is another schematic functional diagram of an image processing device according to embodiments of the present disclosure.

Please referring to FIG. 17, in some implementation, the image processing device 100 includes a determining module 40. The determining module 40 is configured to determine the region of the first scene image other than the scheme as the background portion. The processing module 20 includes a second processing sub-module 22, a third processing sub-module 24 and a fourth processing sub-module 26. The second processing sub-module 22 is configured to process the first scene image to expose the background portion. The third processing sub-module 24 is configured to process the first scene image to increase the brightness of the scheme. The fourth processing sub-module 26 is configured to process the first scene image to generate the strong light scattering effect for the outline of the scheme.

That is, the act at block S40 may be implemented by the determining module 40, the act at block S22 may be implemented by the second processing sub-module 22, the act at block S24 may be implemented by the third processing sub-module 24, and the act at block S26 may be implemented by the fourth processing sub-module 26.

In this way, different image processing is performed on the background portion, the scheme and the outline of the scheme, such that the backlight effect image with the better bokeh effect is obtained.

Figure 18:
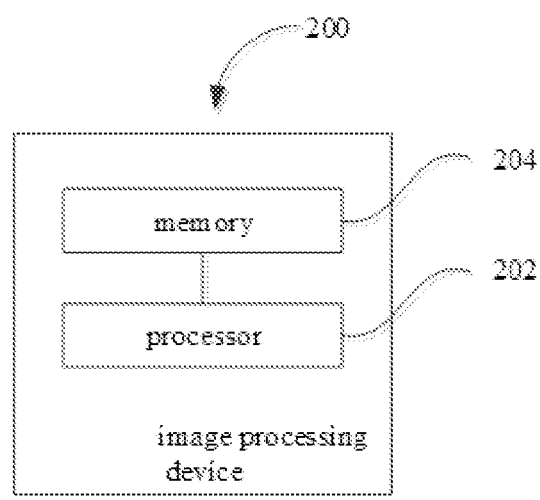
FIG. 18 is a schematic diagram of an image processing device according to embodiments of the present disclosure.

Please referring to FIG. 18, the present disclosure provides another image processing device. The image processing device 200 includes a processor 202 and a memory 204. The memory 204 is configured to store instructions executions executable by the processor 202. The processor 202 is configured to run a program corresponding to the instructions by reading the instructions stored in the memory 204, so as to perform the image processing method described above.

With respect to the details of the processor 202, reference may be made to the above description of embodiments of the present disclosure, which will not be elaborated here.

It should be noted that in the description of the present disclosure, terms such as "first" and "second" are used herein for purposes of description and are not intended to indicate or imply relative importance or significance or to imply the number of indicated technical features. In addition, in the description of the present disclosure, "a plurality of" means two or more than two, unless specified otherwise.

It should be noted that in the description of the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated into a processing module, or these cells may be separate physical existence, or two or more cells are integrated into a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made in the embodiments within the scope of the present disclosure.

What is claimed is:

1. A method for image processing, configured to process scene data acquired by an imaging device, the scene data comprising a first scene image, and the method comprising:
    processing the scene data to obtain a scheme of the first scene image; and
    processing the first scene image corresponding to the scheme to enhance contrast between the scheme of the first scene image and a remaining part of the first scene image,
    wherein processing the scene data to obtain the scheme of the first scene image comprises:
        processing the scene data to obtain a foreground portion of the first scene image;
        determining whether an area ratio of the foreground portion to the first scene image falls within a predetermined range;
        determining the foreground portion as the scheme when the area ratio falls within the predetermined range; and
        determining a region of the first scene image other than the scheme as a background portion, and
    wherein processing the first scene image corresponding to the scheme comprises:
        processing the first scene image to overexpose the background portion;
        processing the first scene image to increase a brightness of the scheme; and
        processing the first scene image to generate a strong light scattering effect for an outline of the scheme.

2. The method according to claim 1, wherein processing the scene data to obtain the scheme of the first scene image further comprises:

processing the scene data to obtain depth information of the first scene image; and obtaining the foreground portion of the first scene image according to the depth information.

3. The method according to claim 2, wherein the scene data comprises a depth image corresponding to the first scene image, and processing the scene data to obtain the depth information of the first scene image comprises:

processing the depth image to obtain depth data of the first scene image; and processing the depth data to obtain the depth information.

4. The method according to claim 2, wherein the scene data comprises a second scene image corresponding to the first scene image, and processing the scene data to obtain the depth information of the first scene image comprises:

processing the first scene image and the second scene image to obtain depth data of the first scene image; and processing the depth data to obtain the depth information.

5. The method according to claim 2, wherein obtaining the foreground portion of the first scene image according to the depth information comprises:

obtaining a foremost point of the first scene image according to the depth information; and searching for a region adjacent to the foremost point and having continuously changing depth as the foreground portion, or searching for a region having a depth difference from the foremost point less than a predetermined threshold as the foreground portion.

6. The method according to claim 1, wherein processing the scene data to obtain the scheme of the first scene image further comprises:

determining that there is no scheme in the first scene image when the area ratio goes beyond the predetermined range;

wherein the method further comprises:

directly outputting the first scene image when there is no scheme in the first scene image.

7. A device for image processing, configured to process scene data acquired by an imaging device, the scene data comprising a first scene image, and the device comprising:

a processor; and a memory, configured to store instructions executable by the processor, wherein the processor is configured to run a program corresponding to the instructions by reading the instructions stored in the memory to:

process the scene data to obtain a scheme of the first scene image;

process the first scene image corresponding to the scheme to enhance contrast between the scheme of the first scene image and a remaining part of the first scene image;

process the scene data to obtain a foreground portion of the first scene image;

determine whether an area ratio of the foreground portion to the first scene image falls within a predetermined range;

determine the foreground portion as the scheme when the area ratio falls within the predetermined range;

determine a region of the first scene image other than the scheme as a background portion;

process the first scene image to overexpose the background portion;

process the first scene image to increase a brightness of the scheme; and process the first scene image to generate a strong light scattering effect for an outline of the scheme.

8. The device according to claim 7, wherein the processor is further configured to:

process the scene data to obtain depth information of the first scene image; and obtain the foreground portion of the first scene image according to the depth information.

9. The device according to claim 8, wherein the scene data comprises a depth image corresponding to the first scene image, and the processor is configured to:

process the depth image to obtain depth data of the first scene image; and process the depth data to obtain the depth information.

10. The device according to claim 8, wherein the scene data comprises a second scene image corresponding to the first scene image, and the processor is further configured to:

process the first scene image and the second scene image to obtain depth data of the first scene image; and process the depth data to obtain the depth information.

11. The device according to claim 8, wherein the processor is further configured to:

obtain a foremost point of the first scene image according to the depth information; and search for a region adjacent to the foremost point and having continuously changing depth as the foreground portion, or search for a region having a depth difference from the foremost point less than a predetermined threshold as the foreground portion.

12. The device according to claim 7, wherein the processor is further configured to:

determine that there is no scheme in the first scene image when the area ratio goes beyond the predetermined range; and directly output the first scene image when there is no scheme in the first scene image.

13. An electronic device, comprising:

an imaging device, configured to acquire scene data, the scene data comprising a first scene image; and a backlight image processing device, electrically coupled to the imaging device, and configured to:

process the scene data to obtain a scheme of the first scene image, process the first scene image corresponding to the scheme to enhance contrast between the scheme of the first scene image and a remaining part of the first scene image, process the scene data to obtain a foreground portion of the first scene image, determine whether an area ratio of the foreground portion to the first scene image falls within a predetermined range, determine the foreground portion as the scheme when the area ratio falls within the predetermined range, determine a region of the first scene image other than the scheme as a background portion, process the first scene image to overexpose the background portion, process the first scene image to increase a brightness of the scheme, and process the first scene image to generate a strong light scattering effect for an outline of the scheme.

14. The electronic device according to claim 13, wherein the imaging device comprises a master camera and an auxiliary camera.

15. The electronic device according to claim 13, wherein the imaging device comprises a camera and a projector.

16. The electronic device according to claim 13, wherein the imaging device comprises a TOF depth camera.

* * * * *